United States Patent [19]
Araujo et al.

[11] Patent Number: 5,735,921
[45] Date of Patent: Apr. 7, 1998

[54] METHOD OF REDUCING LASER-INDUCED OPTICAL DAMAGE IN SILICA

[75] Inventors: Roger J. Araujo, Horseheads; Nicholas F. Borrelli, Elmira; Christine L. Hoaglin, Campbell; Charlene Smith, Corning, all of N.Y.

[73] Assignee: Corning Incorporated, Corning, N.Y.

[21] Appl. No.: 762,513

[22] Filed: Dec. 10, 1996

Related U.S. Application Data

[63] Continuation-in-part of Ser. No. 484,465, Jun. 7, 1995, abandoned.

[51] Int. Cl.$^6$ .................... C03B 37/00; C03B 37/018; C03B 37/01; G02B 6/18
[52] U.S. Cl. ................. 65/32.1; 65/414; 65/426; 65/424; 65/427; 65/900
[58] Field of Search ................. 65/32.1, 32.5, 65/399, 414, 416, 426, 424, 427, 900

[56] References Cited

U.S. PATENT DOCUMENTS

| | | |
|---|---|---|
| 3,933,454 | 1/1976 | DeLuca . |
| 4,501,602 | 2/1985 | Miller et al. . |
| 4,749,395 | 6/1988 | Schneider ................. 65/3.2 |
| 5,043,002 | 8/1991 | Dobbins et al. . |
| 5,086,352 | 2/1992 | Yamagata et al. ............ 359/350 |
| 5,152,819 | 10/1992 | Blackwell et al. . |
| 5,154,744 | 10/1992 | Blackwell et al. . |
| 5,326,729 | 7/1994 | Yaba et al. . |
| 5,385,594 | 1/1995 | Kanamori et al. . |

FOREIGN PATENT DOCUMENTS

| | | |
|---|---|---|
| 0 322 881 A2 | 7/1989 | European Pat. Off. . |
| 0 483 752 A3 | 5/1992 | European Pat. Off. . |
| 0636 586 A | 1/1995 | European Pat. Off. . |
| 8-29960 | 3/1996 | Japan . |
| WO 93/18420 | 9/1993 | WIPO . |

OTHER PUBLICATIONS

G. Hetherington, & K. H. Jack, Thermal Syndicate Ltd, "Fused Quartz and Fused Silica".

J. E. Shelby, "Radiation Effects in Hydrogen–Impregnated Vitreous Silica", *J. Applied Physics*, vol. 50, No. 5, pp. 3702–3706 (May 1979).

Faile et al, "Mechanism of Color Center Destruction in Hydrogen Impregnated Radiation Resistant Glasses", *Mat. Res. Bull.*, vol. 5, pp. 385–390, (1970).

Patent Abstracts of Japan, vol. 9, No. 233 (C–304), 19 Sep. 1985 & JP–A–60 090853 (Furukawa Electric Co., Ltd.et al), 22 May 1985, abstract, p. 3, right–hand column and Chemical Abstracts, vol. 103, No. 16, 21 Oct.,1985, Columbus, Ohio,US; abstract No. 127965, abstract.

Patent Abstracts of Japan, vol. 94, No. 10 & JP–A–06–287022 (Nippon Sekiei Glass Co., Ltd. et al), 11 Oct. 1994, abstract.

Patent Abstracts of Japan, vol. 14, No. 242 (C–721), 23 May 1990 & JP–A–02 064028 (Shin Etsu Chem.Co., Ltd.), 5 Mar. 1990, abstract.

Journal of Non–Crystalline Solids, vol. 179, Nov. 1994, Amsterdam, NL, pp. 214–225, XP000478195, K.Awazu et al.: "Gaseous species and their photochemical reaction in $SiO_2$", p. 215, paragraph 2.3—p. 216, p. 222, paragraph 2.8—p. 223.

Journal of Non–Crystalline Solids, vol. 179, Nov. 1994, Amsterdam, NL, pp. 138–147 XP000478194 J.E.Shelby: "Protonic species in vitreous silica", p. 145, paragraph 7, p. 146.

(List continued on next page.)

*Primary Examiner*—Donald E. Czaja
*Assistant Examiner*—Jacqueline A. Ruller
*Attorney, Agent, or Firm*—Angela N. Nwaneri; Milton M. Peterson

[57] ABSTRACT

The invention relates to the production of high purity fused silica glass which is highly resistant to 248 nm excimer laser-induced optical damage. In particular, this invention relates to a fused silica optical member or blank.

8 Claims, 4 Drawing Sheets

OTHER PUBLICATIONS

Patent Abstracts of Japan, vol. 18, No. 276 (C–1204), 26 May 1994 & JP-A-06 048745 (Fujikura Ltd.), 22 Feb. 1994, abstract; examples 5, 7–9.

Patent Abstracts of Japan, vol. 7, No. 28 (C–149), 4 Feb. 1983 & JP-A-57 183331 (NT&T Corp. et al), 11 Nov. 1982, abstract, & Database WPI Section Ch, Week 51, Derwent Publications, Ltd., London, GB; Class L01, AN 82–10097J, abstract.

Patent Abstracts of Japan, vol. 13, No. 236 (C–602), 30 May 1989 & JP-A-01 045738 (Fujikura Ltd.), 20 Feb. 1989, abstract, p. 2, left–hand column, line 1, p. 2, right–hand column, paragraph 1.

Patent Abstracts of Japan, vol. 12, No. 316 (C–524), 26 Aug. 1988 & JP-A-63 085022 (Fujikura Ltd.), 15 Apr. 1988, abstract, p. 1, right–hand column, p. 2, right–hand column.

Patent Abstracts of Japan, vol. 14, No. 43 (C–681), 26 Jan. 1990 &b JP-A-01 275442 (Furukawa Electric Co., Ltd.), abstract.

METHOD OF REDUCING LASER-INDUCED OPTICAL DAMAGE IN SILICA

This application is a continuation-in-part of U.S. application Ser. No. 08/484,465 filed Jun. 7, 1995, now abandoned.

BACKGROUND OF THE INVENTION

This invention relates to a method of reducing laser-induced optical damage in silica by the removal of oxygen from high purity fused silica. Specifically, the optical damage resistant silica of the invention is formed by consolidating a glass preform in a reducing atmosphere at high temperatures.

Although the exact origin, nature and mechanism of formation of the centers that give rise to absorptions in fused silica are not completely understood, these defects can be identified and tracked by optical absorption and/or electron spin resonance techniques. Two categories of defects can be described: the E' center, with an optical absorbance centered at about 210 nm and an oxygen related defect, having a very broad absorption band at about 260 nm with a corresponding fluorescence at 650 nm.

The E' defect structure consists of an electron trapped in a dangling silicon orbital projecting into interstitial space. As the E' center has an unpaired electron it is detectable by electron spin resonance spectroscopy.

Absorption spectra measured after prolonged exposure to 248 nm excimer laser show an extended absorption shoulder on the low energy side of a strongly peaked 210 nm absorption which extends beyond 260 nm. Unlike the 210 nm absorption band which is attributed to the Si E' center, the 260 nm absorption band is related to oxygen-related defects. A specific model put forth by Awazu and Kawazoe, J. Appl. Phys., Vol. 68, page 3584 (1990), suggests that the origin of the 260 nm absorption band is from the photolysis of dissolved molecular oxygen through a sequence of reactions.

One model for the 260 nm absorption involved the reaction of dissolved molecule oxygen with light to hive oxygen atoms. The reactive oxygen atoms further react with molecular oxygen to give ozone (260 nm absorption). The ozone has a radiative transition with a red (650 nm) emission. Regardless of the mechanism of formation, it is important to note that the 260 nm absorption is related to the molecular oxygen content of the glass.

The dissolved molecular oxygen concentration of silica is dependent on the method by which the silica is made. For example, in a flame hydrolysis process, the dissolved molecular oxygen concentration depends on the $CH_4/O_2$ ratio in the flame used to synthesize $SiO_2$ from the silicon-containing compound. It has been found that the more oxidizing the flame used to make the glass, the more 260 nm absorption is produced with laser irradiation. Along with the 260 nm absorption is formed 1.9 eV (650 nm) red fluorescence. The 260 absorption is undesirable for KrF (248 nm) laser applications as the band is so broad that it encompasses the laser wavelength. Therefore, its minimization or elimination is important for the successful use of silica in KrF applications.

In the past, many methods have been suggested for improving the optical damage resistance of fused silica glass. For example, Faile, S. P., and Roy, D. M., Mechanism of "Color Center Destruction in Hydrogen Impregnated Radiation Resistant Glasses," *Materials Research Bull.*, Vol. 5, pp. 385–390, 1970, have suggested that hydrogen-impregnated glasses tend to resist gamma ray-induced radiation.

Japanese Patent Abstract 40-10228 discloses a process by which a quartz glass article made by melting, is heated at about 400° to 1000° C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950° to 1400° C. followed by heat treatment in an oxygen atmosphere at the same temperature range.

Shelby, J. E., Radiation effects in Hydrogen-impregnated vitreous silica, *J. Applied Physics*, Vol. 50, No. 5, pp. 3702–06 (1979), suggests that irradiation of hydrogen-impregnated vitreous silica suppresses the formation of optical defects, but that hydrogen impregnation also results in the formation of large quantities of bound hydroxyl and hydride, and also results in the expansion or decrease in density of the glass. The above methods involve treating silica in its consolidated form.

There have been other suggestions to treat silica during consolidation in order to remove molecular oxygen. For example, U.S. Pat. No. 3,933,454 to DeLuca describes various methods which have been effective on in reducing the amount of water in fused silica. These methods have involved the consolidation of soot preform in a furnace containing an inert dry atmosphere such as nitrogen, helium, neon or argon, or a reducing atmosphere such as cracked ammonia or forming gas. As discussed therein, these methods have been ineffective in completely removing the defect forming excess oxygen from the silica.

Our studies have confirmed that although the various procedures described above, tend to diminish the absorption induced at 260 nm, the degree of improvement is inadequate for some applications of silica. Thus, there continues to be a need for new and improved methods of making high purity silica resistant to optical damage associated with prolonged exposure to 248 nm excimer laser.

Accordingly, it is the object of the present invention to disclose a method of producing high purity fused silica glass in which UV irradiation does not produce induced absorption at wavelengths close to 248 nm or fluorescence at 650 nm.

SUMMARY OF THE INVENTION

Briefly, the invention relates to a method of making high purity fused silica glass resistant to optical damage caused by exposure to laser radiation. In particular, the invention relates to a method of forming such optical damage resistant fused silica glass by consolidating amorphous particles of fused silica in an atmosphere which is strongly reducing in order to remove excess oxygen from the silica. Excess oxygen is removed from the fused silica due to the imposition of a gradient in the chemical potential of the oxygen, achieved by exposing the glass to a strongly reducing atmosphere.

In one aspect, the invention relates to a method of making an optical member having high resistance to induced absorption at 260 nm and induced fluorescence at 650 nm, and lacking excess oxygen, by:

a) producing a gas stream containing a silicon-containing compound in vapor form capable of being converted through thermal decomposition with oxidation or flame hydrolysis to $SiO_2$;

b) passing the gas stream into the flame of a combustion burner to form amorphous particles of fused $SiO_2$;

c) depositing the amorphous particles onto a support; and d) exposing the amorphous particles to a reducing atmosphere to remove excess oxygen; and e) raising the temperature of the reducing atmosphere to consolidate the amorphous particles into a non-porous body, essentially free of excess oxygen.

Optionally, after depositing the amorphous particles onto a support, the fused silica soot is exposed to a stream of chlorine gas to remove water from the silica.

In another aspect, the invention relates to a method of forming optical damage resistant high purity fused silica glass by consolidating porous, amorphous particles in a highly reducing atmosphere at a temperature in the range of 1000° to 1400° C.

As used in the present specification:

"260 nm absorption band" refers to the extended absorption shoulder on the low energy side of the strongly peaked 210 nm absorption generally found in the absorption spectra of fused silica glass;

"reducing atmosphere" refers to a gaseous atmosphere in which the chemical potential of oxygen is very low. Such an atmosphere tends to extract oxygen from any system in contact with it. Examples of reducing gases include hydrogen, carbon monoxide, diborane, and hydrazine vapor;

"forming gas" is used herein to refer to a He/$H_2$ mixture, one example of a highly reducing atmosphere employed during the consolidation of porous silica.

DETAILED DESCRIPTION OF THE INVENTION

Figure 1:
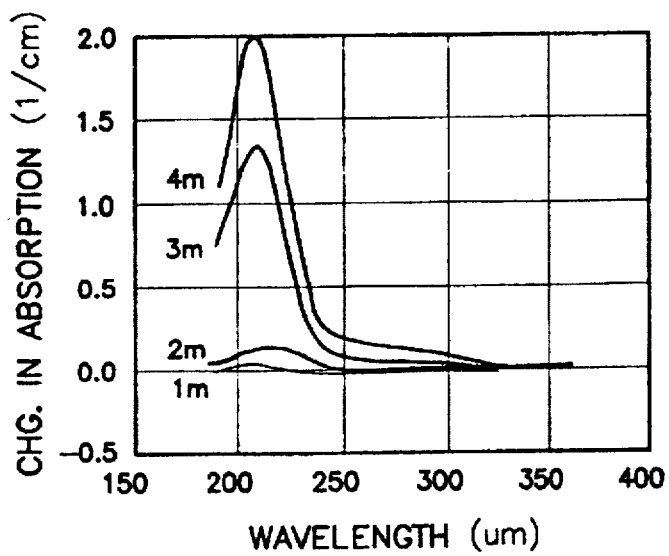
FIGS. 1(a) through 1(c) are comparative drawings of fused silica of the prior art after prolonged exposure to excimer laser, showing in particular, the extended absorption shoulder on the low energy side of the strongly peaked 210 nm absorption.
Figure 1:
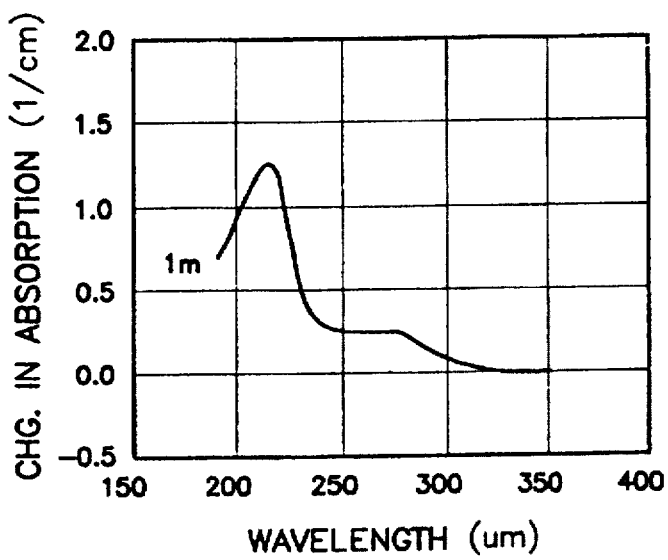
Figure 1:
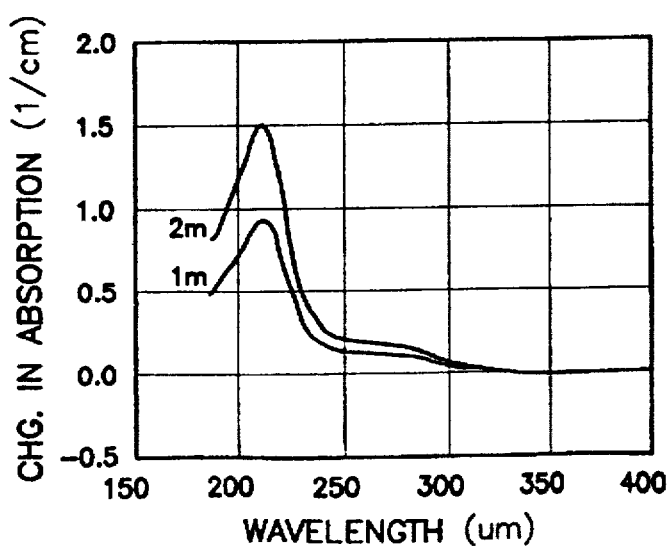

The ideal stoichiometry of silica is $SiO_2$. Oxygen content less than that of perfect stoichiometry may be caused by oxygen vacancies, in the form of silicon-silicon bonds. On the other hand, an oxygen content in excess of that of perfect stoichiometry can be caused by the introduction of metal oxides, such as $Na_2O$, water in the form of water molecules or hydroxyl groups, or molecular oxygen, either diatomic or triatomic (ozone). When silica is made by a flame hydrolysis method, the concentration of metal oxides is negligible, and excess oxygen is present either as molecular oxygen or as one of the forms of water.

In the past, attempts have been made to produce low water content fused silica by flame hydrolysis, followed by treatment in a reducing gas atmosphere. Unfortunately, such methods have not been effective in removing all the water with the result that the amount of water remaining in the glass is still excessive for certain optical applications.

Attempts have also been made to produce low water fused silica by consolidating a soot preform in an inert dry atmosphere such as nitrogen, helium, neon or argon.

Awazu and Kawazoe suggest that ozone exhibits an absorption band at 4.8 eV, and that ozone undergoes chemical reactions that produce luminescence at 1.9 eV. Both of these bands are undesirable for some applications of silica. It has also been suggested that peroxyl radicals are formed when optical fibers are impregnated with hydrogen. Peroxyl radicals involve bonds between two oxygen atoms and are therefore characteristic of excess oxygen. Thus, excess oxygen can give rise to defects and undesired optical absorption bands.

Awazu and Kawazoe, have shown that impregnation with hydrogen considerably diminishes the intensity of the bands associated with molecular diatomic oxygen or ozone. However, it is doubtful that such a technique diminishes the formation of peroxyl radicals. On the contrary, for reasons that are not understood, impregnation with hydrogen actually tend to increase the density of peroxyl radicals in optical fibers as suggested by Freund, *Journal of Non-Crystalline Solids*, (1985), 71, 195–202. Freund has shown that dissolved water in the form of peroxyls can be converted into molecular hydrogen and peroxyl linkages. Furthermore, the presence of hydroxyl groups in the form of either silanols or water increases the absorption at short wavelengths. For example, at $\lambda=160$ nm, the additional absorbance due to hydroxyl groups is $\alpha=0.0014$ cm$^{-1}$/ppm. Therefore, it is desirable to remove all excess oxygen from silica glass rather than to merely tie up molecular water in the form of hydroxyl units or water.

The present invention provides a method of producing silica in which excess oxygen is removed from the glass rather than one in which the excess oxygen is incorporated in one of the forms of water. The removal of the oxygen is accomplished by the diffusion of oxygen from the glass to the atmosphere. Diffusion is promoted by the imposition of a gradient in the chemical potential of oxygen. The gradient in chemical potential is accomplished by exposing the porous silica soot to a reducing atmosphere such as CO.

As more fully discussed below, use of hydrogen as a reducing gas is possible, it is not preferred because the hydrogen is so small that it has a very high diffusion coefficient and as a result it can diffuse into the glass and react with the oxygen to form water so that some of the excess oxygen may not be completely removed from the glass. Although the diffusion coefficient of CO is comparable to that of oxygen, reaction of the two gasses in the glass particles is not expected because there are no cavities in the glass structure large enough to accommodate both molecules in close proximity.

The invention will now be described with particular reference to the drawings. Previously, most high purity fused silica glass and glass members, when subjected to prolonged exposure to 248 nm excimer laser, exhibit an extended absorption shoulder on the low energy side of the strongly peaked 210 nm absorption. This extended absorption shoulder is herein referred to as the 260 nm absorption band. Representative examples of absorption spectra showing the 260 nm absorption band for conventional fused silica are shown in FIGS. 1(a) to 1(c) respectively for glass after 1 to 4 million pulses at 350 mJ/cm$^2$. The fused silica of FIG. 1(a) was not annealed, while the glasses of FIGS. 1(b) and 1(c)

were annealed at 1100° C. for 230 hours, and 1400° C. for 2 hours, respectively.

The 260 nm absorption band may result from the following sequence of equations:

$$O_2 + h\nu = 2O. \quad (1)$$

$$O_2 + O. = O_3 \text{(ozone)} \quad (2)$$

$$O_3 + h\nu = O(^1D) + O_2 \quad (3)$$

$$O(^1D) = O(^3P) + 1.9 \text{ eV(red fluorescence)} \quad (4)$$

specifically, from equation (3) which is the photo decomposition of ozone. The subsequent return to the ground state of the oxygen atom in turn gives rise to the characteristic red fluorescence. Also, we have observed that the onset of absorption at 260 nm is always accompanied by the appearance and strength of the red fluorescence. The strength of the fluorescence scales with the strength of the absorption at 260 nm, indicating that they originate from the same process in agreement with the equations shown above.

The object of the present invention, that is, the production of glass in which 260 nm absorption and 650 nm fluorescence is not caused by exposure to laser radiation, is achieved by forming high purity fused silica glass by consolidating amorphous particles of fused silica in a strongly reducing atmosphere to remove molecular $O_2$ from the resulting silica. If the reducing atmosphere includes $H_2$, the hydrogen can rapidly diffuse into the silica where it may promote the reaction:

$$2H_2 + O_2 = 2H_2O \quad (5)$$

The concentration of $H_2$ in the forming gas is limited in order to minimize the potential formation of Si—OH, as measured by the value of the beta-OH. This formation of Si—OH may be the result of further reaction of the $H_2O$ produced by equation (5) above with selected sites in the network, thus:

$$Si-O-Si + H_2O = 2Si-OH \quad (6)$$

Without intending to be bound by theory, this formation of Si—OH may also be the result of a competing reaction of the $H_2$ with the network in which case it is possible that not only Si—OH, but also Si—H is formed through the following equation:

$$Si-O-Si\ H_2 = Si-OH + Si-H \quad (7)$$

Therefore, if $H_2$ is employed, the amount of $H_2$ in the He/$H_2$ forming gas mixture is limited by the above concern, and is best determined by experimentation for each given process.

In one particularly useful embodiment of the invention, the high purity fused silica is formed by:

a) producing a gas stream coming a silicon-containing compound in vapor form capable of being converted through thermal decomposition with oxidation or flame hydrolysis to $SiO_2$;

b) passing the gas stream into the flame of a combustion burner to form amorphous particles of fused $SiO_2$;

c) depositing the amorphous particles onto a support;

(d) exposing the amorphous particles to a reducing gas atmosphere to remove excess oxygen from the fused silica; and d) raising the temperature of the atmosphere to consolidate the deposit of amorphous particles into a non-porous, transparent glass body, essentially free of excess oxygen.

The reducing atmosphere can be carbon monoxide, diborane, hydrazine, or a hydrogen/inert gas mixture, preferably, carbon monoxide.

If the reducing atmosphere comprises hydrogen, preferably the amount of $H_2$ is in the range of 0.1 to 10% of the total gas mixture. In one preferred embodiment, the amorphous particles are consolidated in a 95He/5$H_2$ atmosphere at a temperature in the range of 1000° to 1400° C.

This process wherein silica in the form of soot is exposed to a reducing atmosphere prior to and throughout the consolidation process differs significantly from earlier suggestions of hydrogen treatment. As mentioned above, several workers have suggested that the deleterious effects can be diminished by impregnating the glass with molecular hydrogen. Each has suggested that hydrogen reacts with the oxygen to produce water or hydroxyl groups. It should be noted, however, that this approach does not remove the oxygen from the glass; it merely incorporates it into another chemical compound. Therefore, it cannot be guaranteed that, under some conditions, irradiation will not be able to produce some of the same excited oxygen species responsible for the induced absorption and fluorescence.

The present invention has the advantage that it removes oxygen from the system completely instead of simply tying it up in a new chemical compound. The present invention comprises the steps of forming silica soot, subjecting the soot to an atmosphere of very low oxygen chemical potential (very strongly reducing) without reacting with the reducing atmosphere, and subsequently consolidating the soot to form transparent glass. The process optionally may include a step in which the soot is dried by bathing it in a chlorine atmosphere prior to being exposed to the atmosphere of low oxygen chemical potential.

In the soot form, the particles of silica are small enough so that oxygen can diffuse a distance equal to the particle diameter in a number of seconds. Therefore, diffusion under the driving force of a gradient in the chemical potential can quickly deplete the silica of oxygen. The soot particles are deoxygenated to the degree required to equate the oxygen chemical potential in the silica to that in the atmosphere. After the glass has been consolidated, it is no longer influenced by the atmosphere because the path length across which oxygen can diffuse in reasonable times is minute compared to the size of the glass objects to be made from the consolidated silica. This is especially true when the temperature is lowered to values below the consolidation temperature.

The low chemical potential atmosphere can be achieved by utilization of any reducing gas at temperatures at or slightly below the consolidation temperature of the soot. Carbon monoxide and forming gas (hydrogen/inert gas mixture) are preferred because they are relatively inexpensive. However, as discussed above, if a hydrogen-containing atmosphere is used to control the chemical potential of oxygen in the atmosphere, some of the hydrogen may permeate the soot and react with oxygen to form some water. Therefore, for applications requiring low water or hydroxyl levels, the most preferred embodiment is the use of carbon monoxide.

EXAMPLE 1

To illustrate the efficacy of the present invention we have measured the 260 nm absorption and the 650 nm fluorescence induced by laser irradiation in four different glasses. Sample 1 was deliberately made under conditions such that it contained a higher than normal concentration of molecular oxygen. It is estimated that the glass contains about $5 \times 10^{17}$ molecules/cm$^3$. Sample 2 was made under standard (conventional) conditions. Sample 3 was consolidated in the presence of forming gas (H$_2$/He) as described in the background of U.S. Pat. No. 3,933,454, in order to deplete the glass of oxygen in the form of water. Sample 4 was consolidated in the presence of carbon monoxide. The object of this experiment was to demonstrate that the mechanism of oxygen removal was not a reaction with hydrogen, but rather diffusion, driven by the low chemical potential of oxygen in the reducing atmosphere. The absorbance at 260 nm induced by one million pulses of 193 nm irradiation at a fluence of 65 mJ/cm$^2$ in each of the samples is shown in Table 1 below.

TABLE 1

| Sample | 1 | 2 | 3 | 4 |
|---|---|---|---|---|
| Absorbance (cm$^{-1}$) | 0.3 | 0.05 | 0.02 | 0 |

Red fluorescence was observed in the standard sample (Sample 2), and very strong fluorescence was observed in the high oxygen sample (Sample 1). No red fluorescence was detected in either of the samples consolidated under reducing conditions. The sample consolidated under carbon monoxide exhibited no induced absorption whatsoever at 260 nm after one million pulses.

Figure 2:
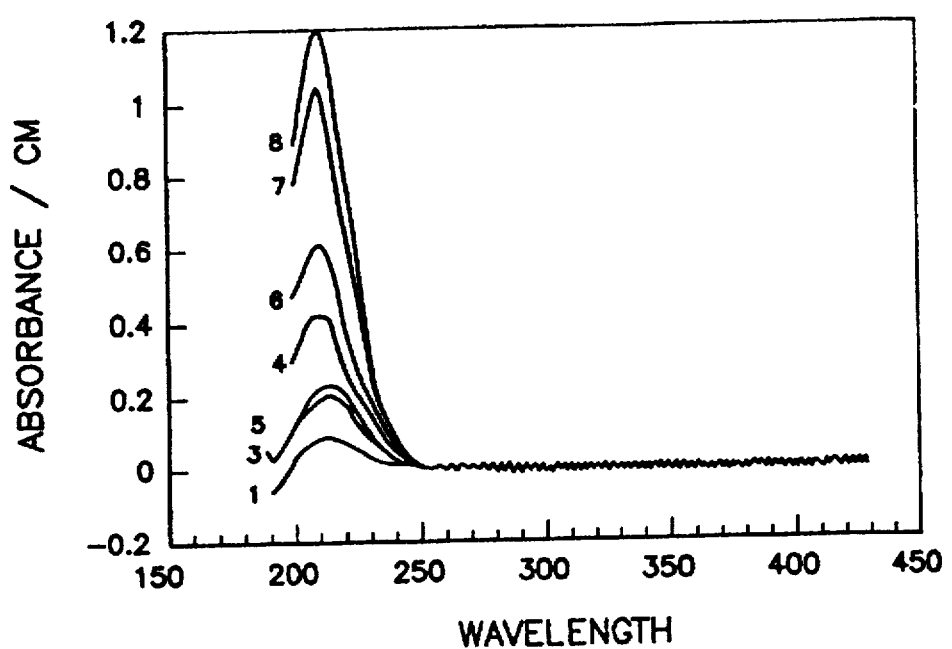
FIG. 2 is a graph of the absorption spectra of the inventive high purity fused silica of the invention after exposure to excimer laser of from 1 to 8 million pulses.

The absorption spectra of the high purity fused silica of the invention after exposure to 1 to 8 million pulses at 350 mJ/cm$^2$, and 400 Hz, are shown in FIG. 2. As can be seen in this diagram, there is a complete absence of extended absorption shoulders on the low energy side of the strongly peaked 216 nm absorption (i.e., the 260 nm absorption bands) that are present in FIGS. 1(a) to 1(c).

Figure 3:
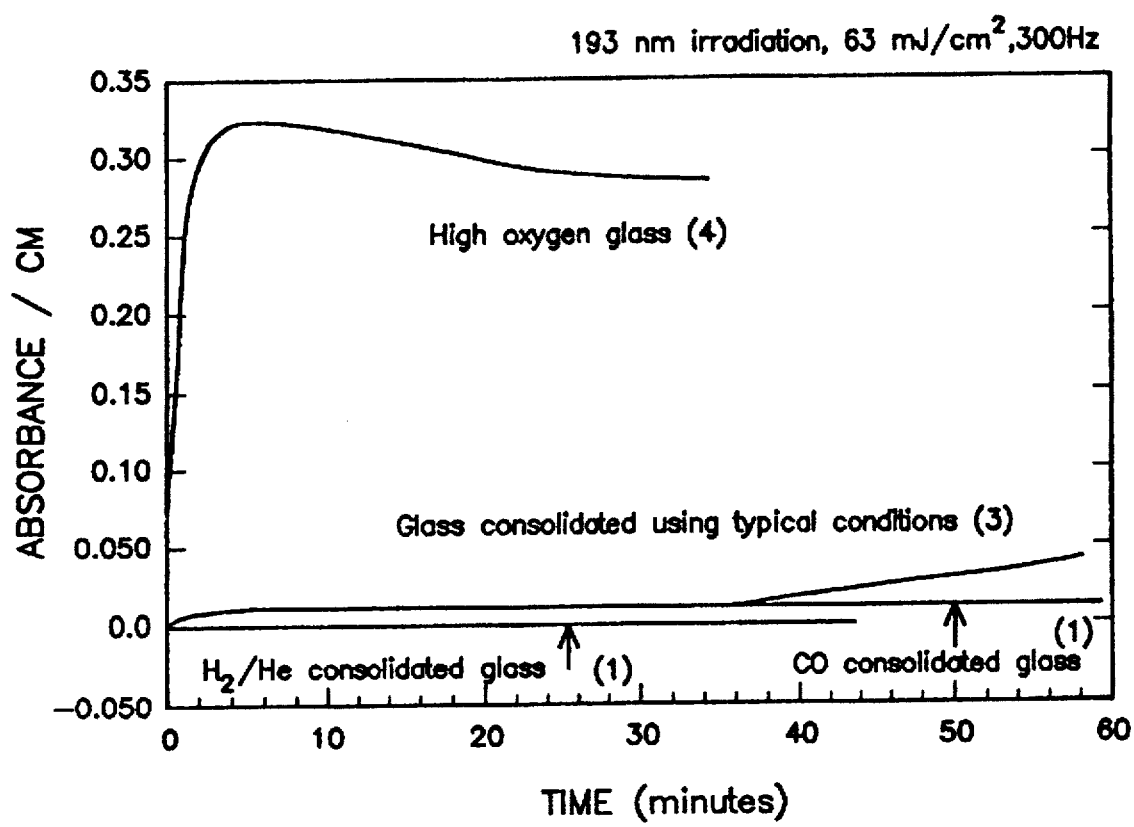
FIG. 3 is a graph comparing the absorbance at the 260 nm absorption band, of fused silica glass of the invention, one sample consolidated in forming gas, i.e. $H_2$/He, the other consolidated in CO, against a conventional fused silica glass consolidated in pure He, and a glass sample having an abnormally high level of oxygen.

FIG. 3, is direct quantitative diagram comparing the absorbance at 260 nm, of two fused silica glass samples of the invention (1) consolidated in a H$_2$/He forming gas, and (2) consolidated in CO, against (3) a conventional fused silica glass consolidated in pure He, and (4) Sample 1 (glass containing abnormally high level of molecular oxygen). All four glass samples were irradiated with 193 nm excimer laser, at 63 mJ/cm$^2$, and 300 Hz. For the high oxygen fused silica, the extended absorption shoulders on the low energy side of the 210 nm absorption band are clearly visible immediately the sample is irradiated with the laser. No absorbance was observed for either the forming gas or Coconsolidated samples of the invention. For the conventional glass sample (3), consolidated under standard (prior art) conditions, after about thirty minutes, absorbance is observed in the 260 nm region, with the absorbance increasing with time. This is in sharp contrast, with the fused silica of the invention, for example, as shown in FIG. 2, where even after 8 million pulses, no extended bands were observed in the spectra in the 260 nm band region.

Figure 4:
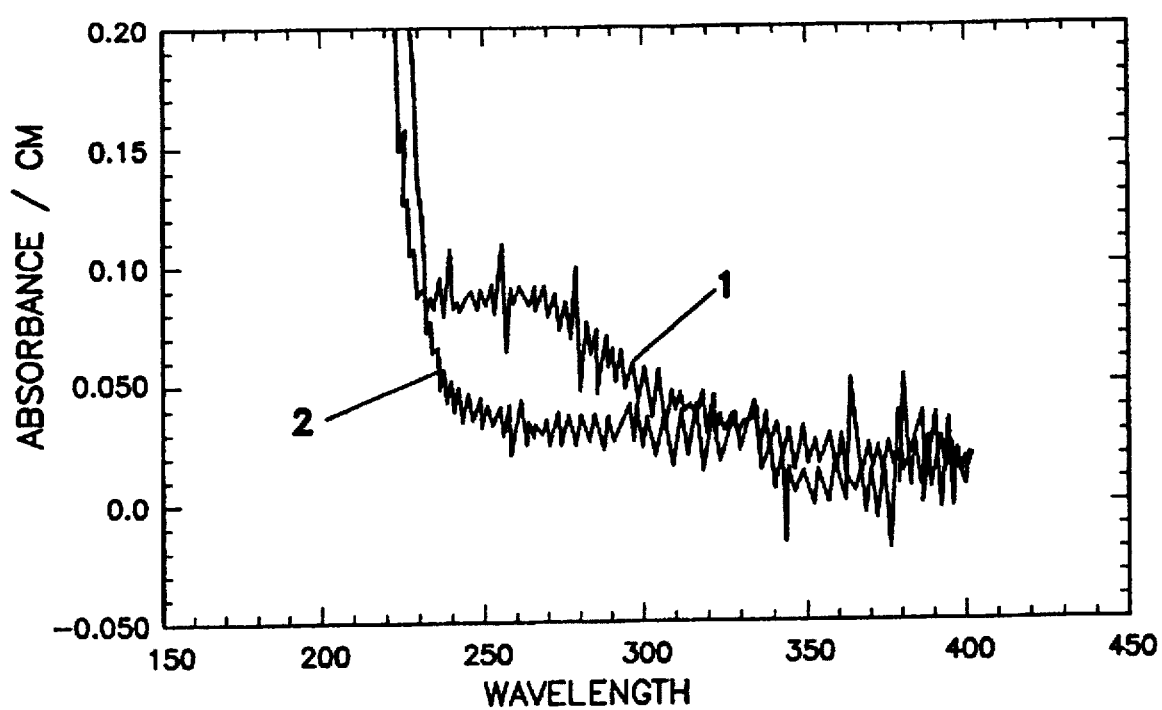
FIG. 4 is an enlarged diagram of the spectral region around the 260 nm absorption band of FIG. 3, showing the absence of the extended absorption shoulder on the low energy side of the 210 nm absorption band in the inventive fused silica consolidated in a hydrogen/helium forming gas.

FIG. 4 is an enlarged diagram of the spectral region around the low energy side of the 216 nm absorption band of FIG. 3, comparing the spectrum of the conventional fused silica after 2 million pulses (line 1), against the spectrum of the inventive fused silica after 6 million pulses (line 2). The absorbance of the conventional fused silica in the 260 absorption band is 0.08/cm, while that of the inventive fused silica consolidated in forming gas is 0.03/cm.

EXAMPLE 2

In this example, a silica soot blank prepared by the outside vapor deposition process using octamethylcyclotetrasiloxane as the silica source was consolidated. The consolidation process was done by placing a piece of soot preform which was 7 mm in diameter and 13 mm in length into a quartz tube with a top equipped with gas ports. The quartz tube was then placed in a furnace at room temperature. The system was first purged with helium at 1000° C. for 15 minutes and then 4.32% hydrogen balance helium was flowed through the system at a rate of 1.5 liter per minute. The furnace temperature was raised to 1420° C. at a rate of 160° C. per hour maintaining the hydrogen/helium flow. The glass sample was cooled rapidly to 1000° C. again maintaining the hydrogen/helium flow. The sample was then cooled to room temperature in an air atmosphere.

EXAMPLE 3

This example was carded out again using a silica soot blank prepared by OVD using OMCTS as the silica source. The consolidation process was done by loading a piece of soot blank which was 7 mm in diameter and 11 mm in length into the quartz tube. The top of the tube was modified so that the gas flow was directed down the center of the blank. The tube was placed into a furnace at room temperature. The system was purged with helium at 1000° C. for 15 minutes and then 4.32% hydrogen balance helium was flowed through the system at a rate of 3 liter/minute. The furnace was ramped from room temperature to 1000° C. at a rate of 250° C. per hour. It was then held at 1000° C. for 2 hours. At the end of the two hour hold, the temperature was ramped to 1420° C. at a rate of 100° C. per hour. The glass sample was cooled to 200° C. over a 16 hour period continuing to flow hydrogen/helium The glass was cooled from 200° C. to room temperature over a period of 4 hours under helium.

Useful silicon-containing compounds for forming the glass of the invention are known such as disclosed collectively in U.S. Pat. Nos. 3,393,454; 5,043,002; 5,152,819; and 5,154,744, all herein incorporated by reference. Preferably the silicon-containing gaseous feedstock includes halide-free, silicon-containing compounds that can be oxidized by flame hydrolysis or pyrolysis, to produce transparent, high-purity silica glass articles. The production of fused silica glass through the use of pyrolyzable and/or hydrolyzable halide-free, silicon-containing compounds as the feedstock components results in carbon dioxide and water as the by-products. Examples of useful halide-free silicon-containing compounds include cyclosiloxane compounds, preferably, polymethylsiloxane such as hexamethyldisiloxane, polymethylcyclosiloxane, and mixtures of these. Examples of particularly useful polymethylcyclosiloxane include octamethylcyclotetrasiloxane, decamethylcylcopentasiloxane, hexamethylcyclotrisiloxane, and mixtures of these.

In addition to polymethylsiloxanes, organosilicon materials satisfying the following three criteria can also be used in the method of the invention:

(1) an operable organosilicon-R compound (R is an element of the Periodic Table) will have a Si—R bond dissociation energy that is no higher than that of the Si—O bond;

(2) an operable organosilicon-R compound will exhibit a significant vapor pressure at temperatures below 250° C. and a boiling point no higher than 350° C.; and, in the interest of safety, (3) an operable organosilicon-R compound will, upon pyrolysis and/or hydrolysis, yield decomposition products besides SiO$_2$ which are deemed to be environmentally safe or the emissions are below acceptable governmental standards.

Three groups of compounds which have been found to be especially useful are categorized below according to the bonding arrangement in the basic structure:

(1) organosilicon-oxygen compounds, having a basic Si—O—Si structure, in particular linear siloxanes wherein an oxygen atom and a single element or group of elements, such as a methyl group, is bonded to the silicon atom;

(2) organosilicon-nitrogen compounds, having a basic Si—N—Si structure, such as aminosilanes, linear silazanes, and cyclosilazanes, wherein a nitrogen atom and a single element or group of elements are bonded to the silicon atom; and (3) siloxasilazanes, having a basic Si—N—Si—O—Si structure, wherein a nitrogen atom and an oxygen atom are bonded to the silicon atom.

Other useful halide-free silicon-containing compounds for the method of the invention include octamethyltrisiloxane (an operable linear siloxane), aminosilanes such as tris (trimethylsilyl) ketenimine, linear silazanes such as nonamethyltrisilazane, cyclosilazanes such octamethylcyclotetrasilazane, and siloxasilazanes such as hexamethylcyclotrisiloxazane.

In one particularly useful method of the invention, halide-free, cyclosiloxane compound such as octamethylcyclotetrasiloxane (OMCTS), represented by the chemical formula, —[SIO(CH$_3$)$_2$]$_4$—, is used as the feedstock for the fused silica boule process, or in the vapor deposition processes such as used in making high purity fused silica for optical waveguide applications.

In addition to halide-free cyclosiloxane compounds, SiCl$_4$ can also be used as the feedstock in the silica boule process to produce high purity fused silica of the invention. However, for safety and environmental reasons, halide-free, cylcosiloxane compounds are preferred.

It is to be understood that the invention is not limited to the above examples which are chosen for illustrative purposes only. Accordingly, various changes and modifications which do not constitute departures from the spirit and scope of the invention will be apparent to persons skilled in the art, which changes and modifications are embraced by the present invention.

We claim:

1. In a method for making a non-porous body of high purity fused silica glass, comprising the steps of:

a.) producing a gas stream containing a silicon-containing compound in vapor form capable of being converted through thermal decomposition with oxidation or flame hydrolysis to SiO$_2$, b.) passing the gas stream into the flame of a combustion burner to form amorphous particles of fused SiO$_2$ containing excess oxygen and c.) depositing the amorphous particles onto a support, the improvement being the steps of exposing the amorphous particles to a reducing atmosphere having an oxygen chemical potential lower than that of the amorphous particles of fused silica, diffusing excess oxygen from the particles to the atmosphere without reacting with said reducing atmosphere and consolidating the deoxygenated particles into a non-porous body of fused silica glass which is essentially free of excess oxygen, and water.

2. The method of claim 1, wherein the consolidation step is carried out in the reducing atmosphere at a temperature in the range of 1000° to 1400° C.

3. The method of claim 1, wherein the reducing atmosphere is selected from the group consisting of carbon monoxide, hydrogen/inert gas mixture, diborane and hydrazine.

4. The method of claim 1, wherein the silicon-containing compound comprises a halide-free polymethylsiloxane.

5. The method of claim 4, wherein the polymethylsiloxane is selected from the group consisting of hexamethyldisiloxane, polymethylcyclosiloxane, and mixtures of these.

6. The method of claim 5, wherein the polymethylcyclosiloxane is selected from the group consisting of octamethylcyclotetrasiloxane, decamethylcylcopentasiloxane, hexamethylcyclotrisiloxane, and mixtures of these.

7. A method in accordance with claim 3 wherein the selected reducing atmosphere is carbon monoxide.

8. A method in accordance with claim 3 wherein the selected reducing atmosphere is a hydrogen/inert gas mixture containing 0.1–10% hydrogen.

* * * * *